July 10, 1962 F. H. SCHMIDT 3,043,581
SHOCK ABSORBER SPRING CLAMP
Filed May 18, 1959 2 Sheets-Sheet 1
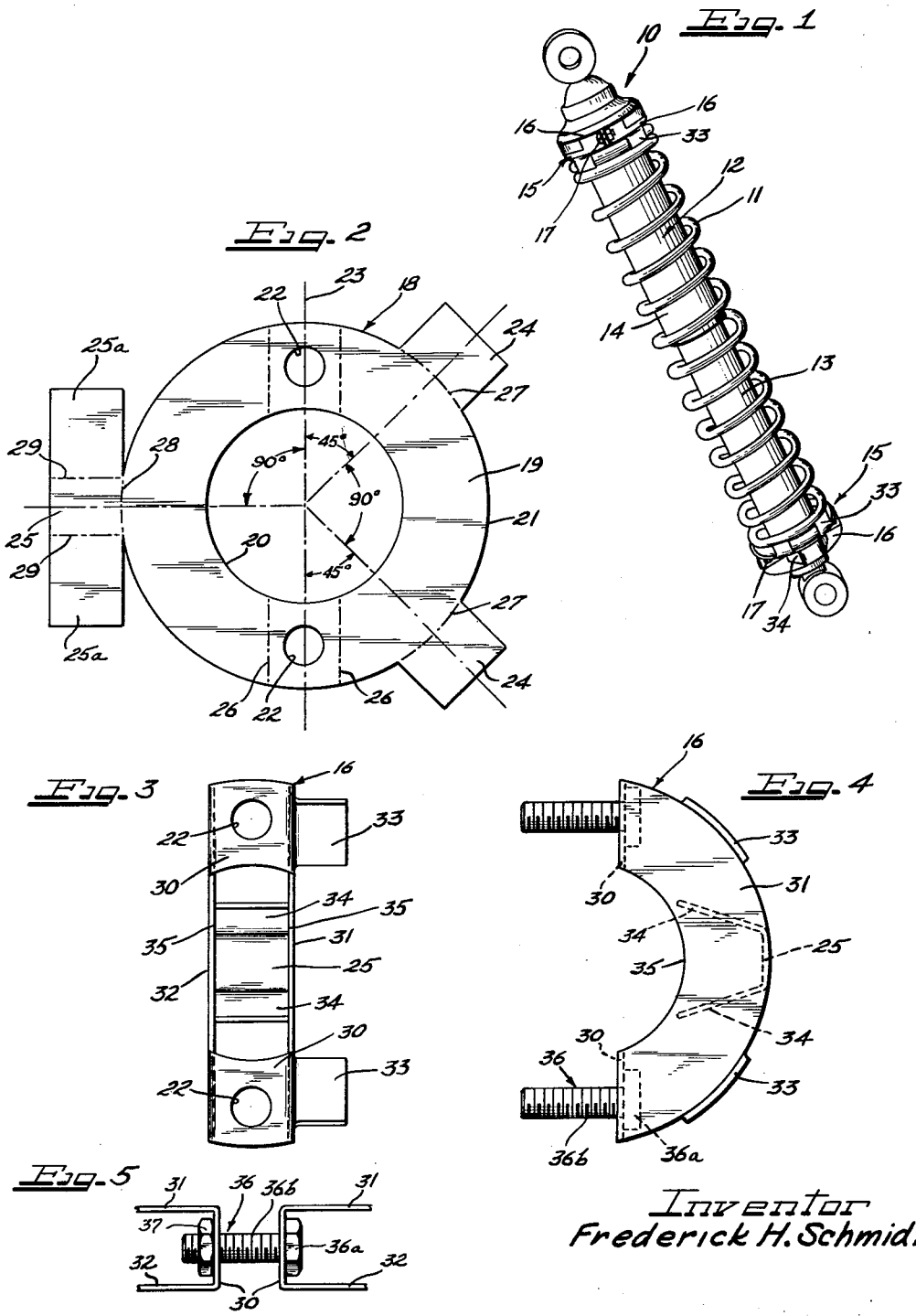
Inventor
Frederick H. Schmidt

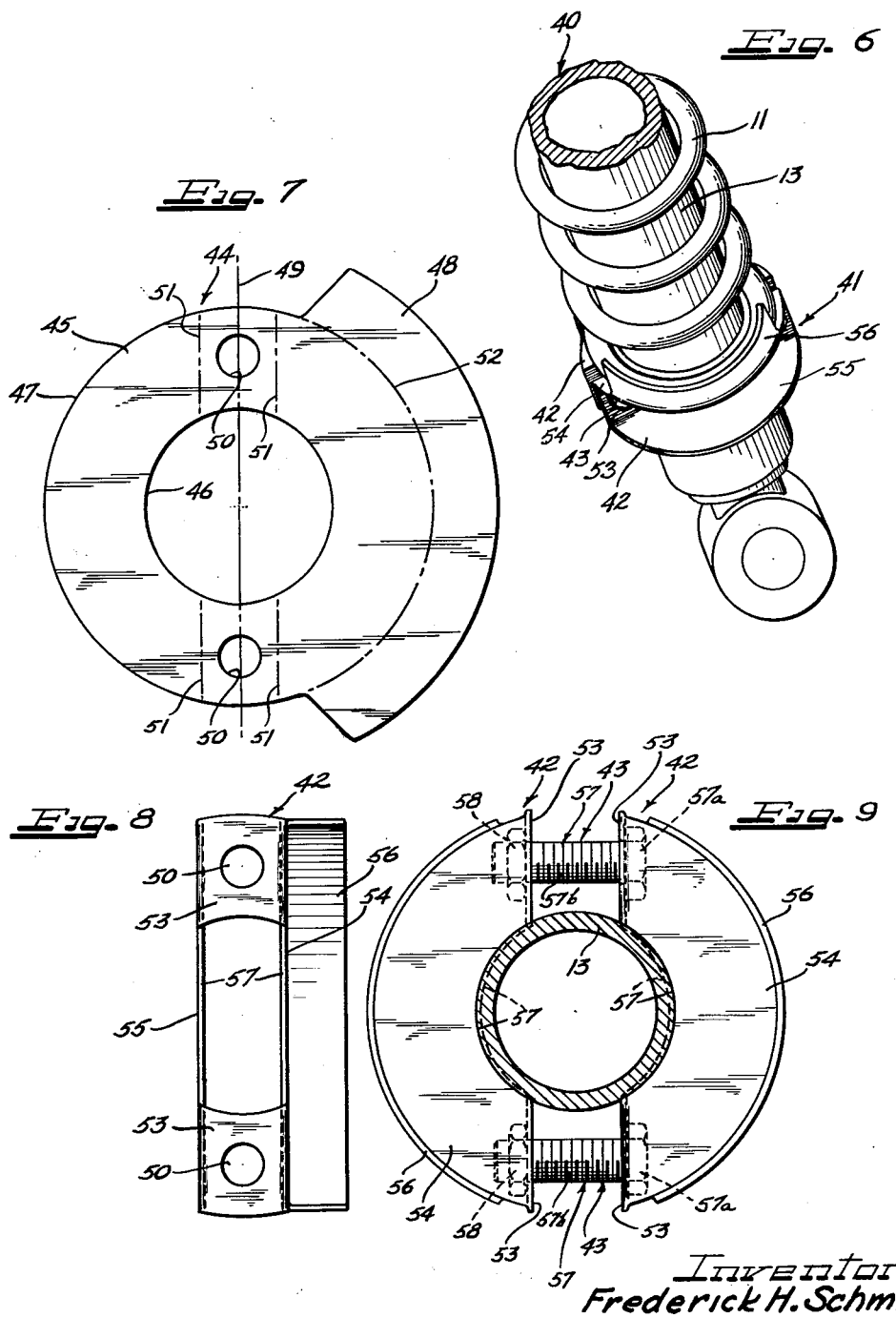

3,043,581
SHOCK ABSORBER SPRING CLAMP

Frederick H. Schmidt, Willowick, Ohio, assignor to Thompson Ramo Wooldridge Inc., Cleveland, Ohio, a corporation of Ohio
Filed May 18, 1959, Ser. No. 813,773
7 Claims. (Cl. 267—8)

This invention relates to clamps especially useful for mounting coil springs on automotive type shock absorbers to add spring support to an automotive spring suspension. Specifically this invention relates to clamps for load leveler springs which are readily applied to and adjusted on shock absorbers of the axially elongating type. Overload springs for surrounding such shock absorbers to add additional spring support to automotive spring suspensions require a mounting means which should be adjustable relative to the shock absorber so that compression of the overload spring can be regulated as desired. Heretofore known mounting means have been integrated with the shock absorber in such a way as to require substitute shock absorber fittings or specially designed original shock absorber equipment, or have been quite expensive forgings or machined elements.

The present invention now provides inexpensive stamped metal clamps which are easily attached to a shock absorber for supporting a coil spring around the shock absorber. The clamps of this invention can be adjusted along the length of the shock absorber to vary the spring load and can be easily replaced without disconnecting the shock absorber.

While the invention will be hereinafter described as embodied in an overload spring clamp for a shock absorber, it should be understood that the clamps of this invention are generally useful for supporting one member around a central member.

According to this invention flat sheet metal, such as steel is stamped in relatively flat ring or hollow circular disk shape with one or more extending tabs. The disk is then bent along two spaced parallel lines on opposite sides of a diameter of the disk to form a fragmental circular member with top and bottom radial flanges connected by axially extending flat faces at the diameter line of the resulting segmental cylindrical shape. The tab or tabs on one flange are bent to project beyond the flange to center the spring on the flange. If desired, a tab on the other flange may be provided to form a spacer between the flanges. The flat axially extending faces which connect the flanges are provided with bolt holes to receive fasteners therethrough, and a pair of clamp members are tightened by these fasteners around the shock absorber to support the spring.

If desired, the hole through the initial stamping can be cut elliptical in shape so that a minor diameter is provided between a pair of opposed clamps to initially engage the shock absorber at areas between the bolt carrying areas so that the clamps will be wrapped around the shock absorber when the fasteners are tightened thereby increasing the clamping grip on the shock absorber.

It is then an object of this invention to provide inexpensive stamped metal clamps especially useful for mounting overload springs on shock absorbers.

Another object of this invention is to provide stamped metal spring clamps.

A still further object of this invention is to provide easily mounted and easily adjusted semi-circular clamps for mounting and centering springs on central supports.

A still further object of this invention is to provide a load-carrying spring clamp for shock absorbers and the like which protects fasteners that draw the clamp elements together.

Another object of this invention is to provide a method of making spring clamps from sheet metal.

A still further object of this invention is to provide spring mounting clamps from sheet metal.

Other and further objects of this invention will be apparent to those skilled in this art from the following detailed description of the annexed sheets of drawings which, by way of preferred examples only, illustrate two embodiments of this invention.

On the drawings:

FIGURE 1 is an isometric view of an overload spring mounted on a shock absorber with clamps according to this invention.

FIGURE 2 is a plan view of a flat sheet metal stamping forming the blank from which the clamps of this invention are made.

FIGURE 3 is an inside end elevational view of a clamp made from the blank of FIGURE 2.

FIGURE 4 is a plan view of the clamp of FIGURE 3 and illustrating fasteners inserted therein.

FIGURE 5 is a fragmentary end view showing the manner in which the flanges of the clamps protect the fastener which draws the clamp parts together.

FIGURE 6 is a fragmentary isometric view of an overload spring mounted on a shock absorber with a modified form of clamp according to this invention.

FIGURE 7 is a plan view of the stamped sheet metal blank from which the clamp member of FIGURE 6 is formed.

FIGURE 8 is an inside end elevational view of a clamp formed from the blank of FIGURE 7.

FIGURE 9 is a plan view of a pair of clamps like the clamp of FIGURE 8 tightened around the shock absorber housing and illustrating the manner in which the initial oval inner circumference of the clamp parts is deformed into circular conformity with the shock absorber housing.

As shown on the drawings:

The assembly view of FIGURE 1 includes a coil spring 11 surrounding a bicycle pump or axially elongating type shock absorber 12 having telescoping tubular housing parts 13 and 14 with a first clamp assembly 15 mounting one end of the spring on the housing 13 and a second clamp assembly 15 of identical construction mounting the other end of the spring on the housing 14. Each clamp assembly 15 is composed of clamping halves 16 of generally semi-cylindrical shape which are held together by fasteners such as nut and bolt assemblies 17 and are drawn into tight clamped engagement with the housings 13 or 14 at any desired axial position on these housings to load the spring 11 as desired. Since the clamping assemblies 15 are of half ring shape, they can be mounted on the shock absorber housings without disconnecting the shock absorber from the spring suspension of the automobile or the like assembly. The clamp halves when drawn together on the shock absorber present a clean circular contour without protruding bolts, corner sections or the like, and not only serve to load the spring by forming firm end abutments for the spring but also serve to center the spring on the housings.

To position and load the spring 11 on the shock absorber with the clamps of this invention it is only necessary to permit the shock absorber casings 13 and 14 to be fully extended and to then so position the clamps on the casings as to provide a desired initial load on the spring 11. Then, when the shock absorber casing parts are in their normal load carrying position, which is foreshortened from the position shown in FIGURE 1, the spring will be compressed and capable of supporting loads.

The clamp members 16 are formed from blanks such as 18 shown in FIGURE 2. These blanks are stamped from flat sheet metal and have an annular main body 19 with a circular inner periphery 20 and a circular outer periphery 21. Bolt holes 22 are stamped through the body 21 along a diameter 23 of the body. A pair of radially projecting tabs 24 extend from the outer periphery 21 of the body 19 on one side of the diameter line 23. These tabs 24 have centers spaced 90° from each other and 45° from the diameter line 23.

A single tab 25 projects from the body 19 on the opposite side of the diameter line 23 and has its center positioned 90° from this diameter line to lie between the tabs 24. As shown the tab 25 has laterally extending integral wing portions 25a.

For purposes of clarity to illustrate the manner in which the blank 18 is bent to form the clamp member 16, bending lines 26 are illustrated on the blank in spaced parallel relation on opposite sides of the diameter line 23 and adjacent the holes 22. Bending lines 27 are illustrated for the tabs 24, a bending line 28 is illustrated for the tab 25 and bending lines 29 as shown for the ears or integral projections 25a of the tab 25.

To form the clamp member 16 from the blank 18 the blank is bent on the bending lines 26 to provide flat axially extending walls or faces 30 containing the bolt holes 22 and a top radially extending flange 31 extending radially outward from one end of the faces 30 together with a bottom radially extending flange 32 extending radially outward from the other end of the faces 30. The tabs 24 are bent at right angles to the flange 31 on the bending lines 27 to form upright spring centering retainers 33. The tab 25 is bent downwardly on the bending line 28 to span the gap between the flanges 31 and 32 while the ears or extensions 25a of this tab are bent inwardly from the downwardly bent tab 25 to form spacers 34 abutting the flanges 31 and 32 to hold these flanges in spaced parallel relation.

The circular inner periphery of the blank becomes a pair of gripping edges 35 on the flanges 31 and 32 between the end faces 30 for engaging the casing of the shock absorber.

The bolts 36 of the fastener assemblies 17 have heads 36a between the flanges 31 and 32 bottomed on the axially extending faces 30 while the shanks 36b of the bolts project through the holes 22 and receive nuts 37 thereon which are bottomed on the opposite faces 30 of the adjoining clamp member 16 as best shown in FIGURE 5. Thus, the nuts 37 and the heads 36a of the bolts are covered by the flanges 31 and 32, and if desired, the nut 37 can be large enough so that it will abut the flanges to prevent rotation, thereby facilitating threading of the bolt into the nut.

From the above description it will be understood that a pair of clamp members 16 are seated in opposed relation around the shock absorber casing with the faces 30 thereof spaced from each other and with the gripping edges 35 thereof engaging the casing. The spring abutments 33 will embrace the end coils of the spring and the two clamp members will provide four equally spaced abutments 33 to center the spring on the casing. The bolts inserted through the bolt holes 22 are tightened to draw the faces 30 of the clamp members toward each other and thereby tightly clamp the edges 35 into biting engagement with the casing.

The radial flanges 31 will support the end coils of the spring in direct seating engagement thereon while the flanges 32 will back up the supporting flanges 31 through the spacer walls 34. The clamp members therefore have a high degree of strength and rigidity and yet may be formed from relatively thin gauge metal.

In the embodiment shown in FIGURE 6 the assembly 40 includes the load-carrying spring 11 on the shock absorber housing 13 as in FIGURE 1 but a modified clamp assembly 41 is provided according to this invention. This clamp assembly includes a pair of opposed half ring type sheet metal clamp members 42 drawn together by nut and bolt type fastener assemblies 43.

Each clamp member 42 is initially formed from a stamped sheet metal blank 44 shown in FIGURE 7. The blank 44 includes an annular body 45 with an elliptical inner periphery 46 and a circular outer periphery 47. A single tab 48 extends from the body 45 outwardly from the periphery 47 on one side of the diameter line 49 through the body. This tab is somewhat less than semi-circular in length.

Bolt holes 50 are formed through the body 45 along the diameter line 49.

To better illustrate the manner in which the clamp 42 is formed from the blank 44 parallel bending lines 51 are illustrated on the body on opposite sides of the diameter 49 and closely adjacent the bolt holes 50 while a bending line 52 is illustrated between the tab 48 and the periphery 47 of the body.

To form the clamp 42 from the blank 44 the body 45 is bent on the bending lines 51 to form flat axially extending faces 53 containing the bolt holes 50 as shown in FIGURE 8. A top flange 54 extends radially outward from one end of the faces 53 while a bottom flange 55 extends radially outward from the opposite end of the faces 53. The tab 48 is bent upwardly from the flange 54 at right angles thereto to provide a cup-shaped spring abutment 56.

The elliptical hole or inner periphery 46 of the blank 44 forms elliptical gripping edges 57 on the inner peripheries of the flanges 54 and 55 between the faces 53.

As shown in FIGURE 9, when a pair of clamps 42 are mounted around the shock absorber casing 13, the gripping edges 57 of the clamps will engage the cylindrical casing initially at the minor diameter of the elliptical shape. However, when the bolt assemblies 43 are tightened, the elliptical contour of these gripping edges will be deformed from the initial dotted line position of FIGURE 9 to the full line position in full conformity with the cylindrical casing 13.

Each clamping bolt assembly 43 includes a bolt 57 with a head 57a between the flanges 54 and 55 bottomed on an axial wall or face 53 and a shank 57b extending through the bolt hole 50 and across the gap between the opposed clamp members 42 and then through the bolt hole 50 of the opposite wall 53 to receive a nut 58 thereon also between the flanges and bottomed on the wall 53. The clamping bolt assemblies 43 are thus fully protected between the flanges of the clamps and if desired, the nut can be of such dimensions as to engage the flanges and prevent rotation relative to the bolt.

The upturned spring abutments 56 of the pair of clamps cooperate to substantially completely surround the end coil of the spring 11, while the flanges 54 on which the end coil seats will be sufficiently rigidified by this continuous abutment so that the spacer walls 34 of the embodiment of FIGURES 1 to 5 is not needed.

The modified clamp assembly 41 is mounted in the same manner as the clamp assembly 15 and functions in the same manner.

In view of the above descriptions it will be understood that this invention now provides an inexpensive rigid stamped sheet metal clamp for springs and the like which not only supports the spring load but also centers the spring on its mounting.

I claim as my invention:

1. A clamp for overload springs on shock absorber assemblies or the like which comprises a pair of opposed fragmental cylindrical members, each having a pair of axially extending apertured faces with top and bottom radially extending flanges integral with said faces and providing concave clamping edges between said faces, the top flange having an axially extending portion on the outer periphery thereof for centering an end coil of a spring on the flange, and fastener assemblies extending through the apertures in said faces and adapted to be tightened for drawing the opposed members toward each other to clamp the gripping edges against the shock absorber housing or the like.

2. A sheet metal clamp comprising a pair of fragmental cylindrical members in spaced opposed relation, each of said members having confronting apertured faces at their outer ends and radially extending flanges at the ends of said faces, each of said flanges having an inner peripheral portion between the faces forming a gripping edge, one of said flanges having upturned abutment means on the outer peripheral edge thereof, said abutment means cooperating to center a member to be supported on the flange, and adjustable fastener means extending through the apertures in said faces and having portions thereof abutting the faces for drawing the members toward each other to engage the clamping edges against a member inserted in the clamp.

3. A clamp comprising a sheet metal ring bent to provide spaced parallel half ring radially extending flanges with inner peripheral gripping edges and axial walls connecting the flanges at the ends thereof, one of said flanges having tabs extending therefrom to center a member thereon, the other of said flanges having integral tab means extending therefrom between the flanges to provide spacer means maintaining the flanges in separated position, and said end walls having fastener receiving apertures therethrough.

4. A clamp member comprising a half ring having spaced parallel radially extending walls with fragmental circular inner and outer edge peripheries, end walls connecting the radially extending walls at the diameter portion of the half ring, said end walls having fastener apertures therethrough whereby a pair of said members having fasteners in said apertures can be drawn together by the fasteners to clamp the inner peripheries thereof around an inserted member, at least one of said radially extending walls having integral tab means extending from its outer edge periphery between said spaced parallel radially extending walls for maintaining said walls in spaced relation.

5. A sheet metal clamp comprising a pair of opposed half ring members each having parallel radially extending fragmental cylindrical flanges with inner gripping edges and end walls connecting the flanges at the diameter portion of the half rings, and fastener means cooperating with said end walls to draw the pair of members together for clamping the inner peripheries of the flanges around an inserted member, at least one of said flanges having an integral tab member extending between said flanges to provide spacer means for maintaining said flanges in spaced relation, said tab member extending from approximately the center section of said flange.

6. An overload spring clamp for shock absorber assemblies which comprises a pair of diametrically opposed half ring members adapted to surround a shock absorber casing, each of said ring members having spaced parallel radially extending flanges with inner peripheral edge portions adapted to grip the shock absorber casing, end walls connected to the flanges of each of said members, fastener means coacting with said end walls to draw the end walls of the opposed members toward each other for clamping the inner peripheries of the flanges thereof against the shock absorber casing, and one of said flanges of each member having axially extending abutment tabs on the outer periphery thereof to center the overload spring on the flange.

7. A clamp adapted for overload springs on shock absorbers composed of two opposed sheet metal half ring members each having a pair of axially spaced inner peripheral gripping edges and axially extending end walls at the ends of the gripping edges, said end walls joining said edges in said axially spaced relation, and fastener means extending through said end walls for drawing the members toward each other to bite the gripping edges into the casing of a shock absorber, at least one of said members having axially extending abutment tabs to center the overload springs.

References Cited in the file of this patent
UNITED STATES PATENTS

| | | |
|---|---|---|
| 1,707,668 | Mason | Apr. 2, 1926 |
| 1,734,407 | Taussig | Nov. 5, 1929 |
| 2,118,499 | Durbin | May 24, 1938 |
| 2,496,893 | Smith | Feb. 7, 1950 |
| 2,535,540 | Lechmere | Dec. 26, 1950 |
| 2,756,045 | Savory | July 24, 1956 |
| 2,874,955 | McIntyre et al. | Feb. 24, 1959 |

FOREIGN PATENTS

| | | |
|---|---|---|
| 445,400 | Great Britain | Apr. 8, 1936 |
| 1,059,988 | France | Nov. 18, 1953 |
| 743,596 | Great Britain | Jan. 18, 1956 |